J. H. WHITNEY.
Grain-Binder.

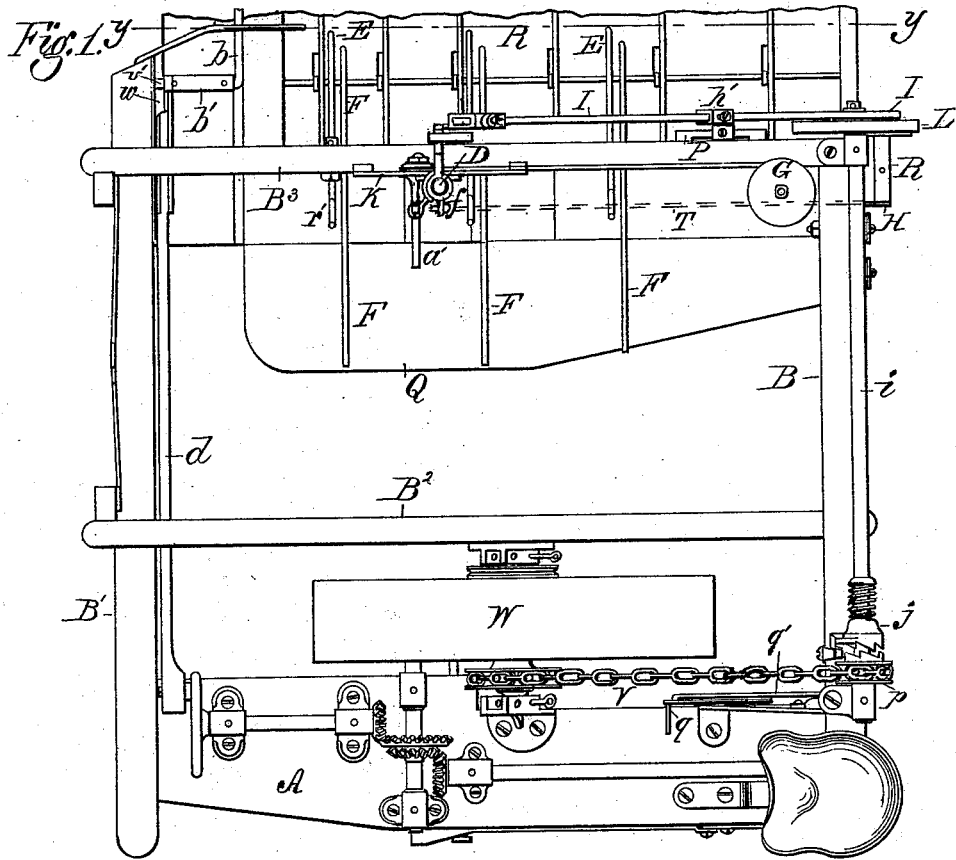
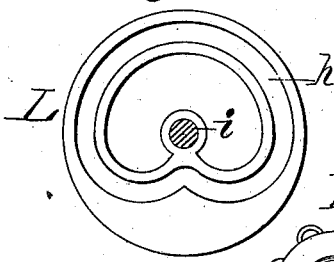
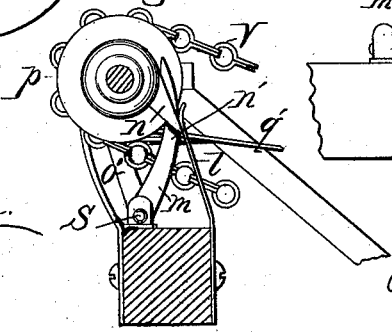
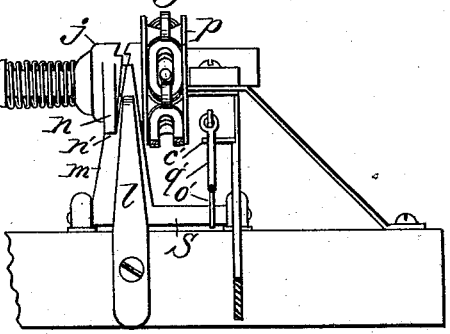

No. 168,120.

Patented Sept. 28, 1875.

3 Sheets--Sheet 2.

WITNESSES:
Will. H. Dodge
Thos. Houghton

INVENTOR:
J. H. Whitney
By Dodge & Son
Attys

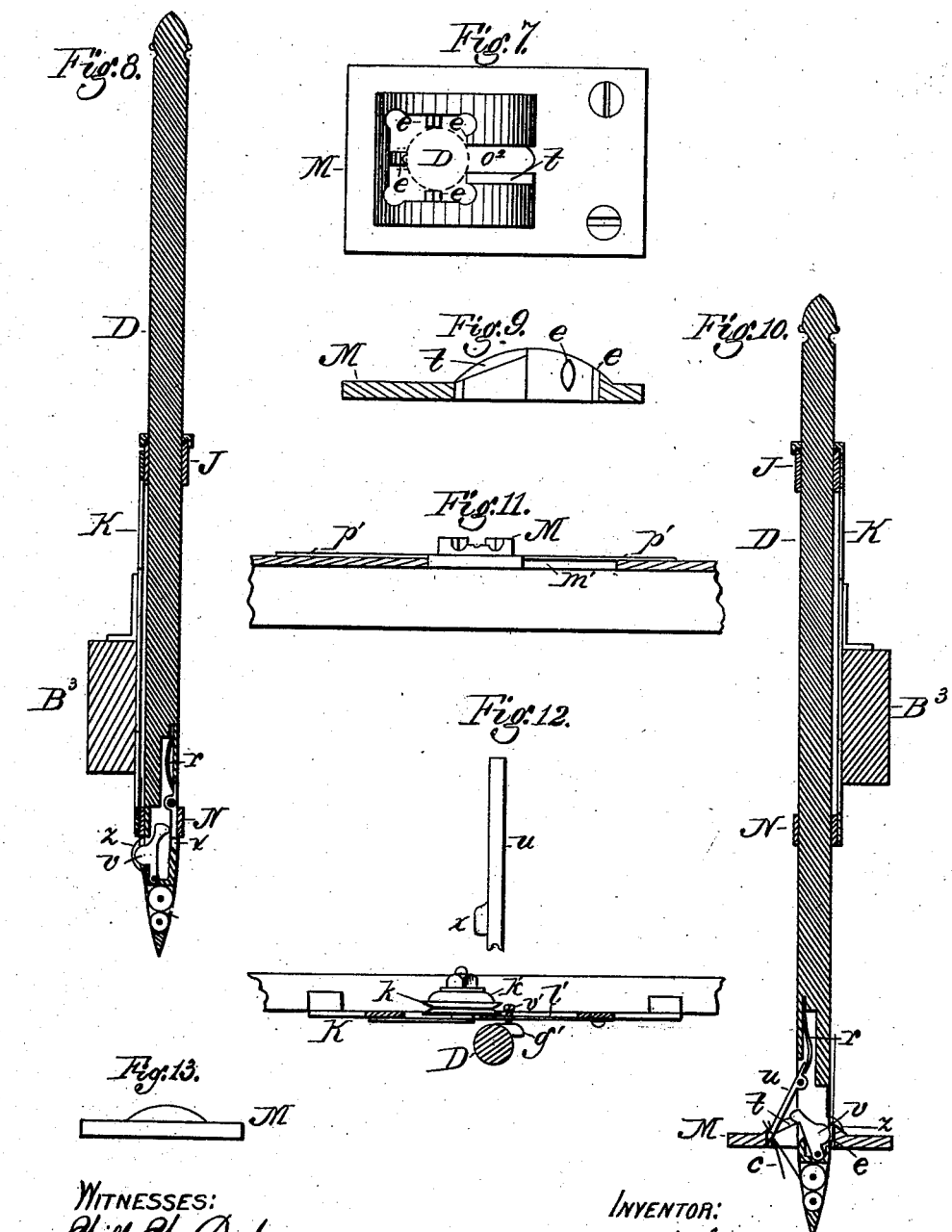

UNITED STATES PATENT OFFICE.

JOHN H. WHITNEY, OF ST. LOUIS, MISSOURI, ASSIGNOR TO SUMNER AND WHITNEY MANUFACTURING COMPANY, OF SAME PLACE.

IMPROVEMENT IN GRAIN-BINDERS.

Specification forming part of Letters Patent No. 168,120, dated September 28, 1875; application filed November 24, 1874.

*To all whom it may concern:*

Be it known that I, JOHN H. WHITNEY, of St. Louis, in the county of St. Louis and State of Missouri, have invented certain Improvements in Grain-Binders, of which the following is a specification:

My invention relates to machines for harvesting grain; and the invention consists of mechanism for binding the grain as it is cut by the machine, and in certain novel features in the construction of the frame of the machine to adapt it to the use or operation intended, as hereinafter more fully described.

Figure 2:
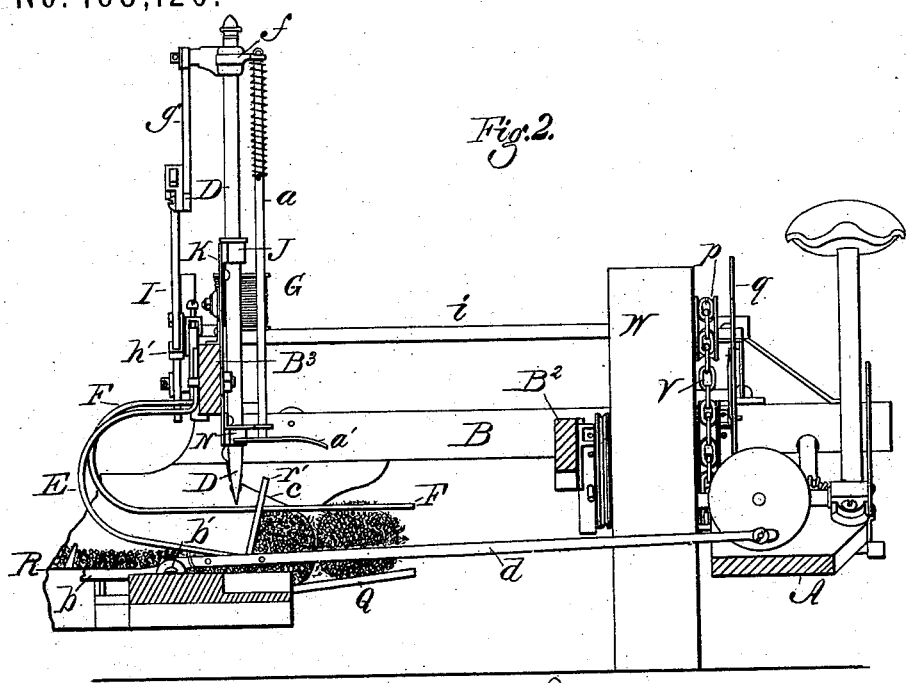
Figure 3:
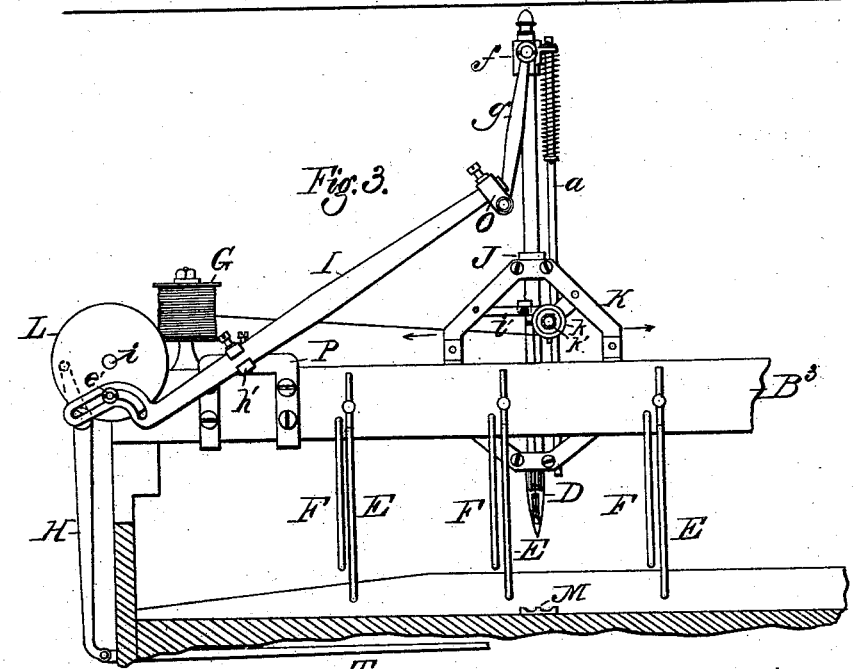

Figure 1 is a top plan view of the machine, with most of the platform and rake broken broken away. Fig. 2 is a front elevation, with the front bar of the frame omitted. Fig. 3 is a transverse vertical section on the line $y\ y$ of Fig. 1. The remaining figures, from 4 to 14, inclusive, represent portions shown more in detail.

In constructing my improved machine I make a frame, which, as shown in Fig. 1, consists of a broad piece, A, or its equivalent, on which the driving mechanism is secured with two bars, B and $B^1$, to which latter are secured two cross-bars, $B^2$ and $B^3$. The peculiar features of this are, first, that the front bar $B^1$ is set considerably forward of the front edge of the platform to afford more room for the bundle when bound, so that its butt-end may not be obstructed in falling to the ground; and, second, that the cross-bar $B^2$ is raised considerably above the face of the platform, so as to give more room for the bundle to pass under it. The cross-bar $B^3$ is elevated over the inner end of the platform, and is used to support the binding mechanism. The driving and supporting wheel W is mounted in adjustable bearings attached to the bars A and $B^2$, the outer end of the platform being also provided with an adjustable supporting-wheel. (Not shown in the drawings.) To the frame is attached a rigid platform, on which is mounted an endless canvas, R, carrying rake-teeth of peculiar construction, which, being the subject of a previous application, need not be herein described, its relative position being shown in Figs. 1 and 2, in each of which a small portion of the endless rake is shown. The cutting apparatus or sickle $b$ is of the usual construction, but, as shown in Fig. 1, its wrist is made very long, reaching from the cutter-bar across to the front bar $B^1$, where it is connected to the pitman $d$ by an equally long sleeve, $b'$, thereby affording an unusually long bearing-surface, by which the usual excessive wear of these parts is prevented. The front end of the wrist protrudes through the sleeve $b'$, and has a bearing on a guide-plate, $w$, secured upon the inner face of bar $B^1$, by which means the long wrist and its sleeve are kept in a horizontal position and prevented from tipping the sickle and causing it to bind in its bearings as it otherwise would. Upon the elevated cross-bar $B^3$ I secure a frame, K, Fig. 3, which has at its upper end a sleeve, J, and at its lower end another sleeve, N, in which I place a reciprocating needle, D, for carrying the binding-wire. This needle D is connected by an adjustable sleeve, $f$, to a connecting-rod, $g$, the opposite end of which is connected, by an adjustable connection, $o$, to the end of lever I, which is pivoted by adjustable bearings $h'$ to a frame or support, P, which latter is secured to the bar $B^3$, as shown in Fig. 3. The rear end of the lever I is curved and slotted, as shown in Fig. 3, where it is connected by a wrist-pin, $e'$, to a wheel or disk, L, which latter is secured to the end of a shaft, $i$, which, as shown in Figs. 1 and 2, extends longitudinally over the rear bar B of the frame to the rear inner corner, where it is provided with a sliding clutch, $j$, arranged to engage with a wheel, $p$, which is operated by a chain, V, from the main wheel W. The wheel $p$ is mounted loosely upon the shaft $i$, so that when the clutch $j$ is disconnected therefrom it will not turn the shaft $i$, and, consequently, the binding mechanism will remain stationary until it is thrown into connection by the driver.

In order to automatically disconnect the clutch $j$ from the wheel $p$ I arrange a rock-shaft, S, (see Figs. 5 and 6,) under the wheel, this rock-shaft having two vertically-projecting arms, $m$ and $o^1$, the latter being connected by a rod, $q'$, to a lever, $q$, located so as to be within reach of the driver, as shown in Figs. 1 and 2, this lever being so constructed that it can be operated either by the hand or foot, as may be most convenient, there being, as shown in Fig. 6, a stop or pin, $c'$, against which the arm $o^1$ strikes to limit its movement. The other arm, m, extends up in front of the clutch j, and is provided with a shoulder, n', on its side, against which an arm, n', projecting radially from the clutch, engages, as shown in Figs. 5 and 6, the arm m being held against the clutch by a spring, l, so as to be always in a position to engage with the arm n of the clutch as the latter is brought over. As shown in Fig. 6, the upper end of the arm m has its side next to the arm n of the clutch made inclined, so that as the latter moves along this inclined face it will shove the clutch back on its shaft i, thus automatically disconnecting the clutch from the wheel p, after which the arm of the clutch will rest on the shoulder n', which will thus prevent the shaft i from rotating until the arm m is drawn forward by the driver by means of the lever q, as before described. As shown in Fig. 5, the construction of the arm n and shoulder n' are such that the former will tend to hold the arm m in contact with the clutch, thus relieving the spring l from excessive strain, allowing a weaker spring to be used, and also preventing the disconnection of the arms m and n' in case the spring should be broken.

It will thus be seen that the movements of the needle D are under the control of the driver, who can set it in operation at will, thereby regulating the size of the bundles, or causing the binding to take place whenever a bundle of the required size has been formed.

The wheel L, which operates the needle D by means of the lever I, as above explained, has on its opposite face a cam-groove, h, as shown in Fig. 4; and to the rear side of the bar B, close to this wheel, I pivot a lever, H, (shown in Fig. 3,) its bearing being a long sleeve, R, Fig. 1. The upper end of this lever H is provided with a wrist-pin, which engages in the cam-groove h, while its lower arm extends down to a point in line with the platform, where it is connected by a rod, T, to a rack that operates the twister, located under the plate M, directly in line with the needle, but not shown in the drawings, as it forms the subject of a separate application heretofore filed by me.

It will thus be seen that the wheel L operates both the needle and the twister, the peculiar construction of the curved slotted end of lever I and the shape of the cam-groove h, together with their relative positions, being such that while the needle is descending the twister remains stationary, the needle then remaining stationary while the twister performs its operation on the wire, after which the needle is drawn up and the motion of the twister reversed simultaneously.

The needle D is a straight, round, pointed rod, which may be made of gas-pipe about an inch and a quarter in diameter. Its construction is shown in Figs. 8 and 10. Near its point it has a slot, in which I secure two small grooved rollers, between which the wire passes. In a recess above these rollers I pivot a lever or finger, u, as shown more clearly in Fig. 10, with a spring, r, arranged to bear against its upper end, so as to hold it within the slot or recess in the needle, so that it shall not be caught upon or by the straw as the needle is thrust down through the grain.

Below this finger u I pivot a short lever, v, which has on one side a cam-like projection, which, when the lever is in its normal position, protrudes through the slot, beyond the side of the needle, as shown in Fig. 8, there being a rigid projection, z, on the needle at each side of this projection on the lever z, whereby the latter is protected or prevented from being hit by the straw as the needle descends, the function of this lever v being to throw the lower end of the finger u outward, as shown in Fig. 10, and which is effected by the shoulder on the lever v striking against a projecting point, e', on the plate M. This plate M, which, as shown in Fig. 3, is located on the platform at a point directly under the needle D, is of novel construction, and is an important feature of my invention. Its construction is shown more clearly in Figs. 7 and 9. It is provided with a hole for the needle to enter as it carries the wire down to the twister underneath it, which hole is considerably larger than the diameter of the needle, as indicated in Fig. 7, the object being to allow room for any straw or other substance that may chance to get into it by the side of the needle to pass through freely, and thus prevent the needle from being wedged fast in the plate. In order to afford bearings for the needle, and prevent it from being displaced sidewise, in which case it would not present the wire properly to the twister, I provide a series of bearing-points, e, which are arranged to project inwardly from the inner faces of the hole to such a distance as will permit the needle to pass freely between their inner ends, as shown in Fig. 7, the point e' being the one against which the shoulder of lever v strikes, to throw out the finger u as the needle descends. Leading from the hole in plate M is a slot, $o^2$, into which the wire is shoved, so as to bring it into proper position to be grasped by the twister; and along one side of this slot $o^2$ there is made an inclined face, t, as shown in Figs. 7 and 9, upon which the finger u engages by means of a projection, x, on its side, (see Fig. 12,) and down which incline it is forced as the needle descends, thus forcing its lower end outward, and carrying before it the wire c, as shown in Fig. 10. It will be observed that the lever v is only used to force the finger u out far enough to cause it to engage upon the incline t, after which the incline itself forces it over to the end of the slot, the adjustable sleeve f at the top of the needle permitting the needle to be adjusted vertically, so as to insure its descending just far enough, and no farther. The lower bearing N, in which the needle slides, I so locate that when the needle is elevated it will bring the finger u up within it, as shown in Fig. 8, so that if, from any cause, the spring r should fail to bring the finger back within the needle, it will be forced into its place by the encircling bearing N, as, if it were not brought back into place, but was left with its lower end protruding, it would catch upon the straw as it descended, and would be broken, or would stop the needle.

As shown in Figs. 7 and 9, the plate M is rounded or inclined on its upper surface, from its center toward its outer edges, for the purpose of causing the straw to separate by sliding down these inclines as it is forced down by the needle, thus assisting to separate it, so that the needle may the more readily pass through it. Attached to the sleeve $f$ at the top of the needle, and moving with it, is a vertical rod, $a$, which has a curved cross-bar, $a'$, attached rigidly to its lower end, as shown in Fig. 2, for the purpose of assisting to compress the bundle when the needle descends to bind it, there being a spiral spring applied to the upper portion of the rod $a$, to permit it to yield as much as may be necessary to enable it to act upon bundles of varying sizes. A spool, G, upon which the binding-wire is wound is mounted on the bar $B^3$ near the rear side of the frame, and from whence the wire extends to and around a pulley, $k$, supported on an arm from frame K close alongside of the needle, as shown in Fig. 3. A rubber or other elastic washer, $k'$, is held by a nut against one side of the pulley $k$, to create the necessary tension on the wire, and on the opposite side of the pulley there is arranged a flat spring, $l'$, secured at one end to the frame K, with its free end resting loosely against or close to the pulley $k$, the arrangement of these parts being more clearly shown in Fig. 14. Attached to the needle D is a projection, $g'$, which, as the needle is raised to its highest position, bears against the flat spring $l'$ and presses it against the pulley, thus creating greater tension on the wire so long as the needle is held up, and during which time the bundle is being formed, the object of which will be hereafter explained. A set-screw, $v'$, in this spring $l'$ serves as a means for adjusting the pressure of the spring, and, consequently, the tension, at will. So too, the tension is regulated by a nut on the axis of the pulley $k$, by which it is made to draw more or less tightly around the bundle while the latter is being formed. To the bar $B^3$ is secured a series of curved rods, E, which extend down to near the platform, as shown in Figs. 2 and 3, their curved sides being extended a little way over the inner end of the endless rake R, while their free ends $r'$ are turned up to near a right angle, being slightly inclined from the needle, as shown in Fig. 2, there being sufficient space between the under side of these rods E and the platform to permit the grain to be shoved through under them by the rake. Another set of spring-rods, F, are also attached to the bar $B^3$, which have their free ends extending farther in over the shelf Q, as shown in Figs. 1 and 2, the object of these rods F being to press upon and hold the bundle last bound on the shelf Q, while the next bundle is being formed and bound, the bundle thus held serving as a yielding abutment, against which the succeeding bundle is compressed while being formed, thereby relieving the wire from the needle from a portion of the strain that would otherwise be brought upon it.

While I consider the addition of these rods F, and the holding of the bound bundle against the one being formed, an advantage, it is obvious that they may be dispensed with, and the machine used without them.

The frame K, which supports the needle and its tension-pulley, is made adjustable to and fro on the bar $B^3$, and the plate M and the twister are also made adjustable, the object of which is to so adjust these parts as to suit the length of the grain being cut, and bring the band in the proper position on the bundles. Of course, whenever the needle is moved either forward or back the fulcrum of lever I must be adjusted to correspond, so as to give the proper movement to the needle. In part, this adjustment may also be made by moving the connection O on the end of the lever.

In order to facilitate the adjustment of plate M, it is arranged as shown in Fig. 11, where the plate itself is fitted into a recess, $m'$, in which it can be moved to and fro, the unoccupied portions of the recess being covered by thin metal plates $p'$, one of which projects from the plate M at each side, as shown in Fig. 11.

The above completes the description of my improved machine, aside from the rake and twister, which are described in separate applications heretofore filed.

The operation of the machine is as follows:

As the machine moves forward the grain is cut and falls upon the endless rake R, by which it is carried by a continuous movement along under the rods E against the wire $c$, which extends from the needle D down through the hole in plate M to the twister underneath, where its end has been already secured by one operation of the needle and twister, prior to commencing the binding, care being taken to draw the end of the wire through the needle some distance and hold the free end while the needle descends the first time, when the twister will take and secure it in place. As the cutting continues, the grain is being constantly shoved along under the rods E, and as it begins to accumulate against the wire $c$, it will be rolled or crowded up against the bent ends $r'$ of the rods, and under the rods F, as shown in Fig. 2. When a sufficient quantity has been thus accumulated to form a bundle the driver releases the arm $n$ of the clutch by drawing forward the arm $m$ of the rock-shaft S by means of the lever $q$, when the clutch at once engages with the chain-wheel $p$, and the binding mechanism is set in motion. At this instant the lever I and wrist-pin $e'$ of the wheel L are in the position shown in Fig. 3, and a half-revolution of the wheel carries the needle down, at which time it stops and remains stationary while the wrist-pin $e'$ travels along the curved portion of the slot in the lever, or during a quarter-revolution. As the needle went down it carried the wire down behind the bundle, thus encircling it, the finger $u$ at the same time pushing this strand of the wire out in the slot of plate M, close alongside of the other strand, as shown in Fig. 10, and, while the needle is standing still, both strands of the wire are twisted by the twister underneath, which also severs or cuts the wire; then, during the remaining quarter of a revolution, the needle is raised to its original position and the twister rotated in an opposite direction, thereby disengaging it from the wire, when the operation is complete, and the bundle ready to be removed, if desired.

In case the machine is to be used without the rods F the shelf Q will be made correspondingly narrower, and a "kicker" or device for shoving off the bound bundle added; but I prefer to use it as shown, with the rods F or equivalent means for retaining at least one bundle on the machine while the next is being formed and bound, as it thus serves as a means for assisting in the formation and compression of the succeeding bundle. In this case it is obvious that the bound bundle is gradually pushed along by the accumulating mass, which is forced in against it by the endless rake. It also serves as a means for regulating the size of the bundles and making them uniform, for as soon as the forming bundle is as large as the bound one it will be level with it, and if made larger it will raise the rods F from the bound bundle, and thus the operator always has a means of knowing when to set the binding mechanism in operation.

It will be observed that by this construction I am enabled to dispense with a large portion of the complicated mechanism heretofore employed in this class of machines, the single wheel L serving to communicate motion both to the binder and the twister by means of a single lever and connecting-rod for each. The idea of making a bound bundle serve as a means of helping to form and compress a succeeding bundle I believe to be entirely new, and as it is obvious that other devices or means may be used to hold it in position I do not confine myself to those shown.

Having thus described my invention, what I claim is—

1. In combination with the pitman $d$ and the sickle-bar $b$ the elongated wrist $v'$, having a bearing on or in a guide-plate, $w$, at its front end, substantially as shown and described.

2. The curved rods E, having their inner ends $r'$ turned upward, said rods being arranged in relation to the rake and binding mechanism, substantially as described, for the purpose of forming the bundle, as set forth.

3. The combination of the wheel L, curved slotted lever I, and needle D, arranged to operate substantially as described, for imparting to the needle the required intermittent motions, as set forth.

4. In combination with the wire-carrying needle D and its reciprocating lever, the grooved cam-wheel L, pivoted lever H, and connecting-rod T, all constructed and arranged to operate substantially as described, whereby the intermittent movements are imparted to the wire carrier and twister at the required intervals, as set forth.

5. The clutch $j$, provided with its arm $n$, in combination with the rock-shaft S, provided with the arm $m$, having the inclined face and shoulder $n'$ thereon, for automatically throwing the binding mechanism out of gear with the driving mechanism, substantially as described.

6. In combination with the automatic disconnecting-clutch and driving mechanism, the lever $q$, connected to the rock-shaft S, all constructed to operate substantially as described, for setting the binding devices in operation at will, as set forth.

7. The plate M, having its upper surface rounded or inclined in the line of the movement of the grain to assist in separating the grain for the passage of the needle, substantially as described.

8. The plate M provided with the enlarged opening for the passage of the needle, and the bearing-points $e$ to prevent lateral displacement of the needle, constructed to operate as and for the purpose set forth.

9. The plate M provided with the slot $o^2$ and incline $t$, in combination with the needle D provided with the finger $u$, said parts being constructed to operate substantially as described, for the purpose of delivering the wire properly to the twister, as set forth.

10. The needle D provided with the lever $v$ and rigid projections or guards $z$ and finger $u$, all constructed to operate substantially as described.

11. The combination of friction-pulley $k$, spring $l'$, and the needle provided with the shoulder $g'$, arranged to operate as set forth, for the purpose of giving increased tension to the wire while the bundle is being formed, as set forth.

12. The lever I provided with the adjustable fulcrum $h'$, in combination with the needle D and wheel L, whereby the movements of the needle can be regulated to suit its adjustment on its supporting-bar $B^3$, as set forth.

13. The needle D provided with the finger $u$, and having its lower bearing N arranged substantially as described, whereby the needle is drawn up so as to bring the finger $v$ within said bearing to insure its being closed within the needle, as set forth.

14. The combination of the spring-rods F and the bent rods E, arranged to operate in connection with a grain-binding mechanism, substantially as described.

JOHN H. WHITNEY.

Witnesses:
W. C. DODGE,
WILL. W. DODGE.